S. S. RIEGEL.
LOCOMOTIVE SIDE ROD.
APPLICATION FILED JAN. 4, 1918.
1,300,023.
Patented Apr. 8, 1919.
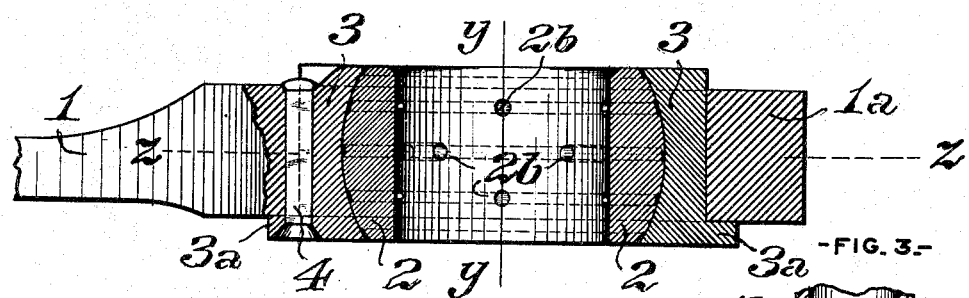
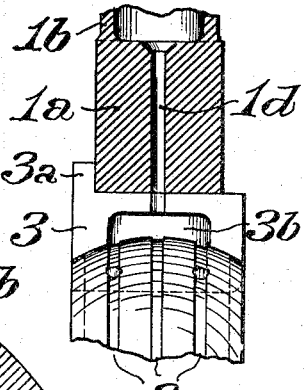
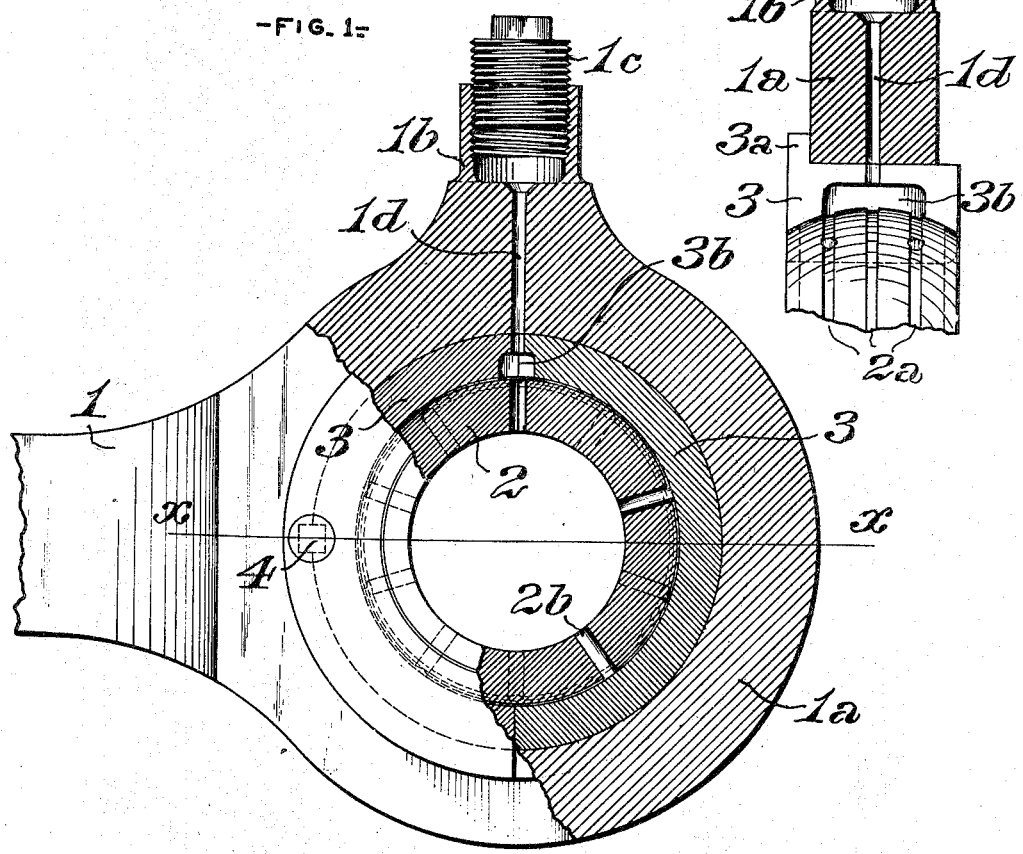
WITNESSES
Edward Wright
S. R. Bell
INVENTOR
Samuel S. Riegel
By Wrenden Bell
atty

UNITED STATES PATENT OFFICE.

SAMUEL S. RIEGEL, OF SCRANTON, PENNSYLVANIA.

LOCOMOTIVE SIDE ROD.

1,300,023.  Specification of Letters Patent.  Patented Apr. 8, 1919.

Application filed January 4, 1918. Serial No. 210,294.

*To all whom it may concern:*

Be it known that I, SAMUEL S. RIEGEL, of Scranton, in the county of Lackawanna and State of Pennsylvania, have invented a certain new and useful Improvement in Locomotive Side Rods, of which improvement the following is a specification.

My invention relates to coupling or "side" rods, for coupling adjacent driving wheels of a locomotive engine, and its object is to provide an appliance of such type which shall be of simple and inexpensive construction and desirably adapted for application in connection with lateral motion driving boxes, and which, in operation, will present all the advantages of grease lubrication, with the simplicity of construction of the ordinary rod having a pressed-in bushing.

The improvement claimed is hereinafter fully set forth.

In the accompanying drawings: Figure 1 is a view, partly in side elevation and partly in section on the line $z\ z$ of Fig. 2, of a locomotive side rod stub end, illustrating an application of my invention; Fig. 2, a horizontal section, on the line $x\ x$ of Fig. 1; and Fig. 3, a partial vertical transverse section, on the line $y\ y$ of Fig. 2.

In the practice of my invention, as applied, in the instance shown, in a solid ended side rod, 1, the stub end $1^a$, of the rod which is to be coupled to the crank pin of a driving wheel secured on a lateral motion or floating driving axle, is preferably, as shown, of cylindrical form, in order to combine lightness with strength, and is provided with a lubricant cup, $1^b$, which may be either forged on, or secured detachably to it, and is closed by a removable cap $1^c$.

A crank pin bearing or brass, 2, which is turned spherically on its periphery, and bored out to suit the diameter of the crank pin to which the stub end is to be coupled, is fitted neatly between several sections of annular steel bushings, 3, 3, which, when assembled on the bearing, 2, are pressed into place in a cylindrical opening extending through the stub end, and are locked against rotation therein by a key, 4, fitted between one of them and the adjacent bore of the stub end, and secured in place. A flange, $3^a$, is formed on one end of each of the bushing sections, making their length, in axial direction, equal to that of the bearing, 2, and preventing longitudinal movement in one direction in the stub end.

A plurality of peripheral grooves, $2^a$, is formed in the bearing, 2, to which lubricant from the cup, $1^b$, is supplied through a duct, $1^d$, leading through the stub end into a transversely extending recess, $3^b$, formed in the vertical meeting faces of the bushing sections, 3, 3, and open to each of the peripheral grooves, $2^a$, of the bearing. Radial ducts, $2^b$, extend from the grooves, $2^a$, to the inner surface of the bushing.

In operation, the bearing, 2, by reason of being neatly fitted in the longitudinally divided bushing, 3, 3, and on the crank pin, is free to both oscillate about the center of its segmental spherical periphery, and to rotate about the axis of its cylindrical bore, either on the crank pin, as is most generally the case, or in the bushing. Its range of movement is sufficient to accommodate the maximum lateral play allowed to driving boxes; it is prevented from working out of the rod laterally; and by the construction of ducts and peripheral grooves which are provided, as above described, it receives liberal lubrication, by a common form of rod grease, on both its inner and outer surfaces.

I claim as my invention and desire to secure by Letters Patent:

1. The combination of a locomotive side rod stub end; a spherically turned and cylindrically bored crank pin bearing; a longitudinally divided annular bushing, in which said bearing is fitted, and which is itself fixed in a transverse bore in the stub end; and means for supplying lubricant to both the inner and the outer surfaces of the bearing.

2. The combination of a locomotive side rod stub end; a lubricant cup thereon; a spherically turned and cylindrically bored crank pin bearing; a longitudinally divided annular bushing, in which said bearing is fitted, and which is itself fixed in a transverse bore in the stub end; and a plurality of ducts establishing communication between the lubricant cup and both the inner and outer surfaces of the bearing.

3. The combination of a locomotive side rod stub end; a lubricant cup thereon; a spherically turned and cylindrically bored crank pin bearing, having a plurality of peripheral grooves and communicating radial ducts; and a longitudinally divided annular bushing, in which said bearing is fitted, and which is itself fixed in a transverse bore in the stub end; said bushing having a lubricant recess communicating with the lubricant cup and with the peripheral grooves of the bearing.

SAMUEL S. RIEGEL.

Witnesses:
 JOSEPH J. DONAHOE,
 NICHOLAS J. KLEIN.